United States Patent
Manzi

(10) Patent No.: US 9,104,925 B2
(45) Date of Patent: Aug. 11, 2015

(54) ULTRA-HIGH-FREQUENCY, UHF, RADIO FREQUENCY IDENTIFICATION, RFID, READER, RFID NETWORK AND METHOD FOR COMMUNICATION IN AN RFID NETWORK

(71) Applicant: ams AG, Unterpremstatten (AT)

(72) Inventor: Giuliano Manzi, Graz (AT)

(73) Assignee: ams AG, Unterpremstaetten (AT)

( * ) Notice: Subject to any disclaimer, the term of this patent is extended or adjusted under 35 U.S.C. 154(b) by 128 days.

(21) Appl. No.: 13/769,263

(22) Filed: Feb. 15, 2013

(65) Prior Publication Data

US 2013/0234832 A1 Sep. 12, 2013

(30) Foreign Application Priority Data

Feb. 17, 2012 (EP) .................................... 12156008

(51) Int. Cl.
*H04Q 5/22* (2006.01)
*G06K 7/10* (2006.01)
*G06K 7/00* (2006.01)
*G06K 19/07* (2006.01)

(52) U.S. Cl.
CPC .......... *G06K 7/10237* (2013.01); *G06K 7/0008* (2013.01); *G06K 19/0723* (2013.01)

(58) Field of Classification Search
CPC ..... H04W 84/12; H04W 4/008; H04W 76/02; H04W 28/18; H04W 84/10; H04W 84/18; H04W 12/04; H04W 12/08; H04W 12/06; H04W 28/06; H04W 48/08; H04W 48/16; H04W 4/02; H04W 72/00; H04W 76/023
USPC .............. 340/10.2, 12.5, 572.1–572.9, 10.51, 340/10.52, 825.56, 825.76, 310.12
See application file for complete search history.

(56) References Cited

U.S. PATENT DOCUMENTS

| | | |
|---|---|---|
| 2006/0052055 A1 | 3/2006 | Rowse et al. |
| 2006/0232419 A1* | 10/2006 | Tomioka et al. ........... 340/572.7 |
| 2006/0280149 A1 | 12/2006 | Kuhl et al. |
| 2007/0001851 A1* | 1/2007 | Reynolds et al. .......... 340/572.1 |
| 2007/0164109 A1 | 7/2007 | Ridings et al. |
| 2007/0171073 A1 | 7/2007 | Ariyoshi et al. |
| 2007/0236350 A1 | 10/2007 | Nystrom et al. |
| 2008/0018433 A1 | 1/2008 | Pitt-Pladdy |
| 2008/0074263 A1 | 3/2008 | Rofougaran et al. |

(Continued)

OTHER PUBLICATIONS

"Reader to Reader technology" by Inside Contactless (Contact: Bruno Charrat), Internet Citation, Jul. 30, 2004, pp. 1-30, XP002615806, retrieved from the Internet: URL:http://www.smartcard.co.u k/articles/R2R%20Technology% 201_0.pdf [retrieved on Jan. 5, 2011].

"Wireless Medium Access Control (MAC) and Physical Layer (PHY) Specifications for Low-Rate Wireless Personal Area Networks (LRWPNAs)", IEEE-TG15.4, Part 15.4, IEEE Std 802.15.4 - 2003 (Revision of 2003), Sep. 8, 2006.

(Continued)

*Primary Examiner* — Daniel Previl
(74) *Attorney, Agent, or Firm* — McDermott Will & Emery LLP

(57) ABSTRACT

In one embodiment a UHF RFID reader is adapted to operate in either a reader mode or in a tag emulation mode, wherein in the reader mode the UHF RFID reader communicates with at least one RFID tag to access the at least one tag's memory contents and in the tag emulation mode the UHF RFID reader communicates with at least one other UHF RFID reader to share memory content with the at least one other UHF RFID reader. Furthermore, an RFID network and a method for communication in an RFID network are described.

7 Claims, 8 Drawing Sheets

(56) References Cited

U.S. PATENT DOCUMENTS

Figure 1A:
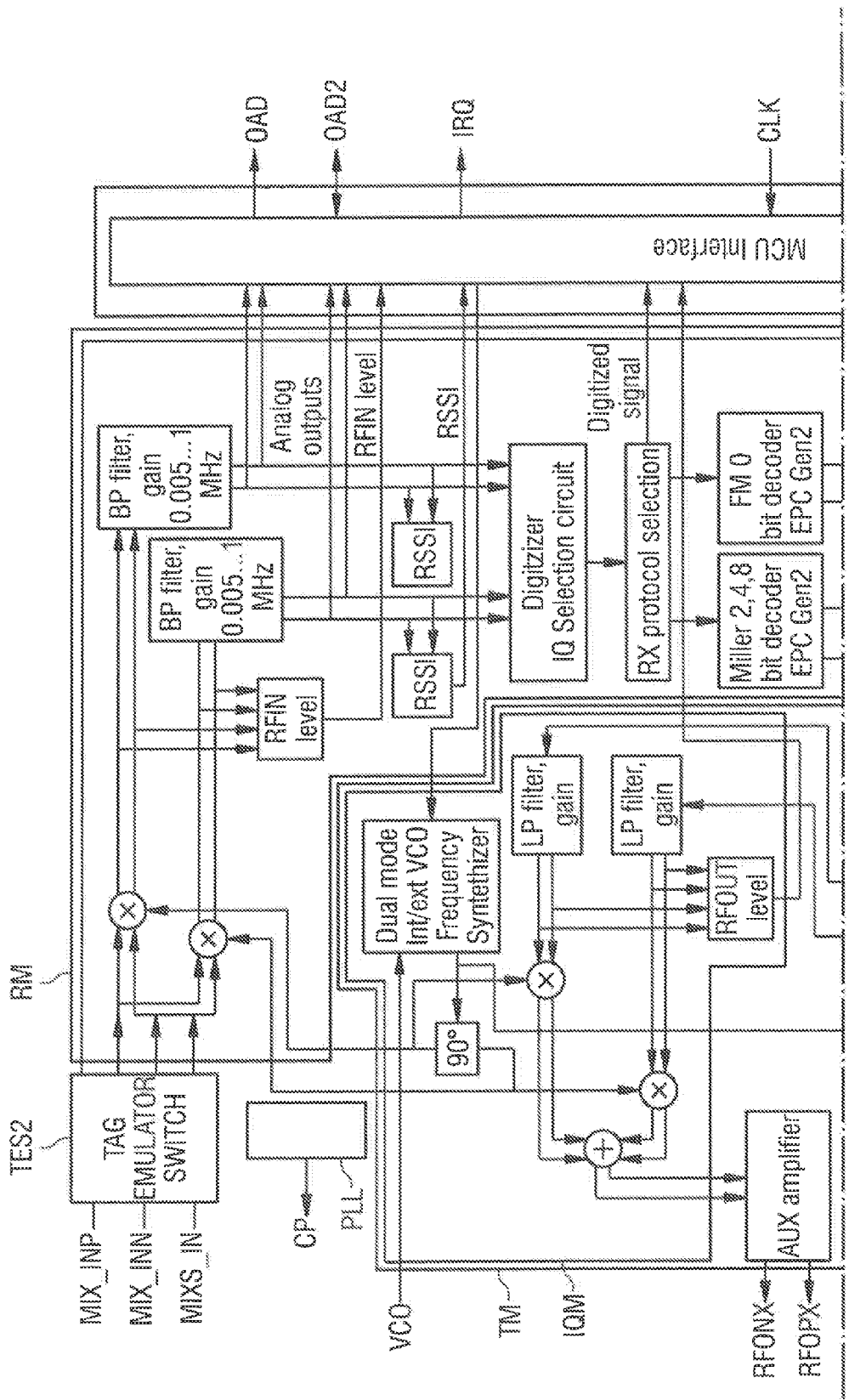

| | | |
|---|---|---|
| 2008/0157968 A1 | 7/2008 | Cunningham et al. |
| 2008/0245851 A1* | 10/2008 | Kowalski ...................... 235/375 |
| 2012/0129571 A1* | 5/2012 | Charrat et al. ............. 455/550.1 |
| 2012/0221695 A1* | 8/2012 | Rose et al. .................... 709/223 |
| 2014/0009268 A1* | 1/2014 | Oshima et al. ............... 340/12.5 |

OTHER PUBLICATIONS

"ZigBee Specification" ZigBee Document 053474r17—Jan. 17, 2008, ZigBee Standards Organization.

* cited by examiner

ULTRA-HIGH-FREQUENCY, UHF, RADIO FREQUENCY IDENTIFICATION, RFID, READER, RFID NETWORK AND METHOD FOR COMMUNICATION IN AN RFID NETWORK

Radio Frequency Identification, RFID, tag and reader systems may operate over a wide range of frequencies, including low-frequency (LF) applications, high-frequency (HF) applications, and ultra-high-frequency applications (UHF). LF applications typically operate from 125 to 148.5 kHz. HF applications typically operate at 13.56 MHz. UHF applications typically operate from 300 MHz to 3 GHz. The "read range" of an RFID tag and reader system is often defined as the distance from which a reader can communicate with a tag. An association is created between a reader and tags within its read range or within its operating range. Passive LF and HF applications offer very short read ranges, often requiring the RFID tag to be within 2 to 30 cm of a reader for successful communication. Passive UHF applications typically offer longer read ranges, allowing RFID tags to be within 2 to 12 meters or more of a reader for successful communication. However, various environmental factors can detune an RFID tag, thus modifying the operating frequency and potentially affecting the received power and the read range of the RFID tag. RFID tags in the presence of metals and liquids may experience detuning due to absorption or parasitic capacitance provided by these materials.

In special UHF RFID applications like stock monitoring in large shops, warehouse or distribution centres, it is crucial to control the amount of products in order to refill shelves or replace products if expired or obsolete. Since the area that needs to be monitored is large, it is necessary to install a vast number of readers to have all the passive RFID tags in the range of an associated reader, e.g. in the range of 12 m.

When using currently available UHF RFID reader technologies, a large amount of readers has to be installed. Each reader has to be connected via a local area network, LAN, in a wired or wireless manner or via a serial or a bus connection to a mainframe with middleware software that collects information from each reader on the associated UHF RFID tags. The middleware software has e.g. a database storing data of tags which can be accessed by a warehouse application. The reader network deployment requires installation of a large amount of cable in case of wired connection or wireless interfaces, e.g. UHF reader towards wireless LAN like WiFI 802.11x or any other radio technology, and suitable access points or a hub and a switch in case of a wired connection.

The present invention focuses on UHF RFID technology using active or passive tags.

The present invention starts out from an RFID system using a peer-to-peer concept. In this system a requester reader is enabled to reach a tag located outside its operating range by the help of other intermediate readers acting as repeaters of the signal generated by the requester reader. The signal repeating causes collision with other queries generated by other readers rendering the system inefficient.

It is therefore an objective to enhance communication in RFID systems.

The objective is achieved by the subject matter of the independent patent claims. Embodiments and developments of the invention are subject matter of the dependent claims.

In one embodiment an UHF RFID reader is adapted to selectively operate in either a reader mode or a tag emulation mode. In the reader mode the UHF RFID reader communicates with at least one RFID tag to access the at least one tag's memory contents. In the tag emulation mode the UHF RFID reader communicates with at least one other UHF RFID reader to share memory content with the at least one other RFID reader.

In the reader mode the reader interrogates at least one associated tag and receives at least one data item stored in the tag's memory. In the tag emulation mode the reader communicates with at least one other reader in order to access the other reader's memory or to give the other reader access to its own memory. Subsequently, information contained in a reader's memory can be read by another reader.

By this, each reader is enabled to communicate with other readers. Information concerning tag data can therefore be collected by just one central reader called main reader and can collectively be transmitted by the main reader via a network interface to a central database. Only the main reader needs to be connected to the database. Advantageously, no extra cabling is needed to connect every reader to a network interface. No extra wireless radio needs to be connected for an alternative network connection, either.

In another embodiment the reader comprises a tag emulation module which is adapted to imitate operation of an RFID tag in the tag emulation mode.

By means of the tag emulation module the RFID reader simulates the operation of an RFID tag whenever the reader operates in the tag emulation mode.

For the communication between readers and tags a well-defined protocol is used. This protocol can be, for instance, the UHF RFID gen 2 protocol, the ISO 18000/6C protocol or a proprietary protocol. The physical layer, i.e. the physical channel of this protocol is reused and implemented in the tag emulation module. Consequently, readers are enabled to communicate with each other for exchange of tag data without collision.

In another exemplary embodiment the reader further comprises a receiver module, a transmitter module, an interface module and a control module. The receiver module is adapted to receive an RFID signal and to decode this signal into received data. The transmitter module is adapted to encode data to be sent and provide an RFID signal depending on the data to be sent. The interface module is coupled to the receiver module and the transmitter module. The control module is coupled via the interface module to the tag emulation module, to the receiver module and to the transmitter module. The control module is adapted to run the RFID reader in the reader mode or in the tag emulation mode.

In the reader mode the reader initiates communication with the at least one tag by sending a command, e.g. a command according to the standard protocol employed, followed by data. The tag responds to the request by backscattering the reader's frequency and at the same time transmitting the requested data item. This incoming RFID signal is processed by the receiver module within the reader, protocol information is removed and the data item is decoded. The control module accesses the received data item via the interface module.

In tag emulation mode the control module initiates following a request or command from another reader an information exchange with another reader by respective control of the transmitter module together with the emulation module via the interface module. A response from another reader is received by the tag emulation mode and processed in the receiver module. Beacon-based communication is used in the procedure. Therefore, the communication amongst readers is synchronized.

In another embodiment the tag emulation module comprises a first tag emulator switch coupled to an output of the transmitter module and a modulator component. The modulator component is implemented as part of the transmitter component. The modulator component is implemented as part of the transmitter module and is adapted to realize back-scattering functionality.

In a reader that employs just one antenna for transmitting and receiving RFID signals the first tag emulator switch is coupled to the output of the transmitter module. To achieve operation of a tag the first tag emulator switch switches an output impedance of the transmitter module between two different states. These states are defined as matched state and unmatched state. By switching the impedance, the power level of the antenna is adapted. The back-scattering functionality of a tag is realized within the modulator component.

In a further embodiment the modulator component comprises a single-step I/Q-modulator providing a single sideband radio frequency output signal.

Using the I/Q-modulator, impulse/quadrature-modulator, a baseband signal is up-converted using quadrature mixers which results in a single-sideband RF output signal.

In another embodiment the first tag emulator switch is enabled to switch an output impedance of the transmitter module between two states depending on reader mode or tag emulation mode.

In another embodiment the reader further comprises a second tag emulator switch coupled to an input of the receiver module. The second tag emulator switch is enabled to switch an input impedance of the receiver module between two states depending on reader mode or tag emulation mode.

In readers that employ two different antennas, i.e. one antenna connected to the output of the transmitter module and the second one connected to the input of the receiver module, the unmatched or mismatched state is created at the transmitter and the receiver module. In the mismatched state, the respective antenna reflects power and absorbs only a small amount of power. The higher the mismatch, the higher amount of power is reflected.

In a further embodiment the reader's interface module comprises a memory component adapted to store a plurality of data items and/or network topology-related information.

In an embodiment an RFID network comprises a main reader according to one of the embodiments described above, a plurality of subordinate readers each according to one of the embodiments described above and a plurality of RFID tags. The main reader is adapted to be coupled to a database via a network connection. The subordinate RFID readers are coupled to the main reader. Each tag is associated with one subordinate reader or with the main reader in the function of the main or subordinate readers operating range. The main reader is adapted to communicate with the subordinate readers in accordance with a topology of the RFID network and to exchange data from the plurality of tags with the database. Each subordinate reader is adapted to communicate with the main reader and/or another subordinate reader in accordance with the defined network topology using the tag emulation mode and to send an RFID request or an RFID command to associated RFID tags using the reader mode. Each RFID tag is adapted to generate an RFID response to the RFID command or RFID request sent by the main reader or its associated subordinate reader.

In the RFID network only one RFID reader, i.e. the main RFID reader, interfaces with a database using a network connection like a LAN or wireless LAN connection for transferring tag-related data to this database. Subordinate RFID readers are coupled to the main reader in e.g. a wireless manner. All readers collect information from their associated tags. Subordinate readers which do not have direct connection with the main reader transfer information stored in their respective memory component to the next subordinate reader according to the defined network topology using well-defined protocols.

This RFID network enables a deployment which has lower costs and is easier to achieve because only the main reader has to have a network interface to the database. This interface to the middleware is preferably a secure interface.

Subordinate readers do not have an interface to the database of the middleware.

The term "network topology" refers to the structure of the RFID network. The topology defined can be, for instance, a star topology, a peer-to-peer topology or a cluster-tree topology.

The main reader can also be called the root of the RFID network. Each reader operates in compliance with the standard protocol and is able to operate as an active or passive tag in the tag emulation mode.

In another embodiment the main reader is set up to initiate the communication with the subordinate readers, to define the topology of the RFID network and to store the defined topology.

For initiating the communication to the subordinate readers, the main readers uses beacon-based communication. As a first step, the topology of the RFID network is defined by the main reader in an ad hoc manner. The topology is stored in the main reader's memory component, for instance as a table. The main reader may change the network configuration or topology at any time and send an update of a neighbour table information to each subordinate reader in order to guarantee optimal network operation. The subordinate readers are enabled to communicate with their neighbouring subordinate readers according to the network topology. Information on neighbouring readers is stored in the neighbour table which is distributed by the main reader.

In one embodiment a method for communication in an RFID network comprises the steps:
  performing by a main reader an initialization of a network topology of the RFID network of one of the embodiments described above,
  operating either in tag emulation mode or in reader mode.

In a further embodiment the initialization of the topology comprises:
  detecting subordinate readers present in the network,
  assigning to each detected subordinate reader an identification number and a network level,
  defining the topology of the RFID network, and
  storing the defined topology in the main reader's memory component.

Thereby, a reader at a certain network level uses the reader mode to communicate with a reader in a next lower network level, i.e. the next reader further away from the main reader. This reader uses the tag emulation mode in communication with a reader in a next higher network level i.e. in direction to the main reader.

In another embodiment detecting subordinate readers present in the network comprises:
  sending a beacon signal for communication start,
  receiving response to the beacon signal from the subordinate readers and/or tags present in the network,
  sending a beacon signal for communication end.

In a further embodiment operating in reader mode comprises:
  sending, by a subordinate reader and/or by the main reader, a request to an associated RFID tag, respectively,
  storing, by the subordinate reader and/or by the main reader, a data item received from the associated tag, respectively.

For the operation in reader mode a well-defined protocol, like the UHF Gen 2 protocol or ISO18000-6c protocol, is used.

In a further embodiment operating in tag emulation mode comprises:
- accessing, by the main reader, at least one data item stored in the subordinate reader,
- sending, by the main reader, the beacon signal for communication start,
- receiving a request for data from the subordinate reader,
- transmitting, by the main reader, the requested data to the subordinate reader.

By using beacon signals the communication between main reader and subordinate readers is advantageously synchronized.

For a communication between main reader and subordinate readers other protocols like, for example, the IEEE 802.15.4 also known as ZigBee protocol can be used, as well.

Figure 1B:
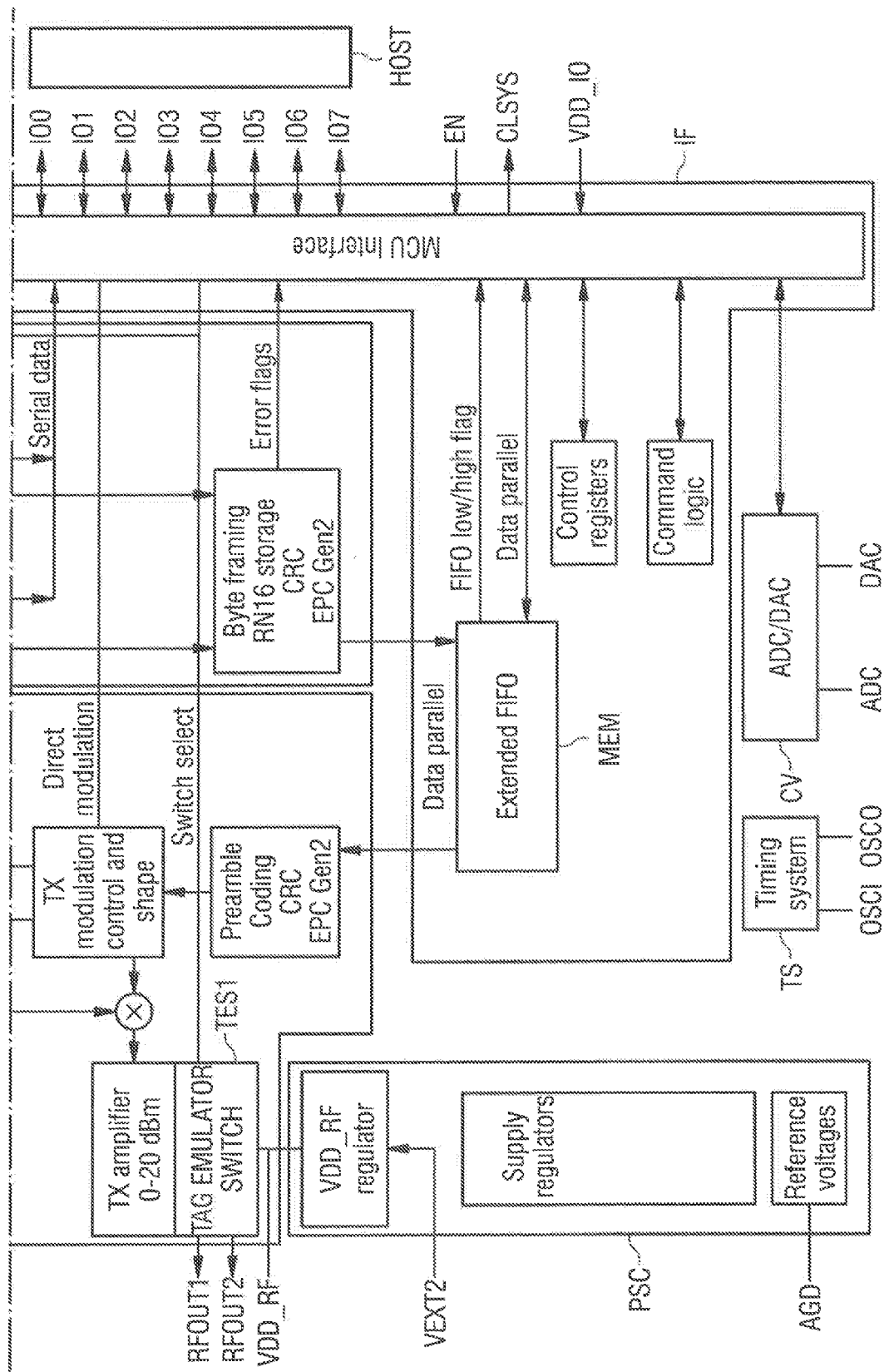
Figure 2:
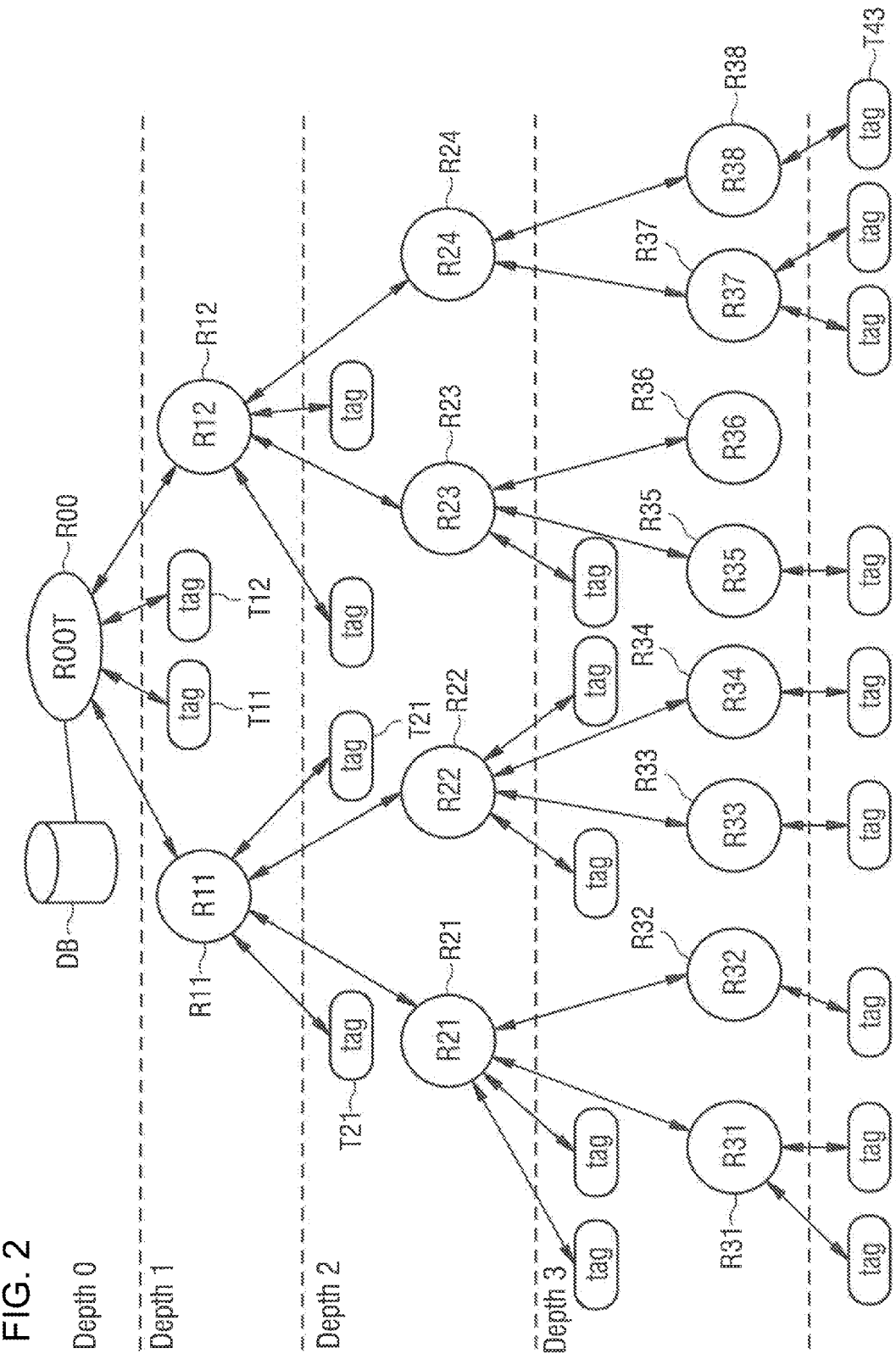
Figure 3B:
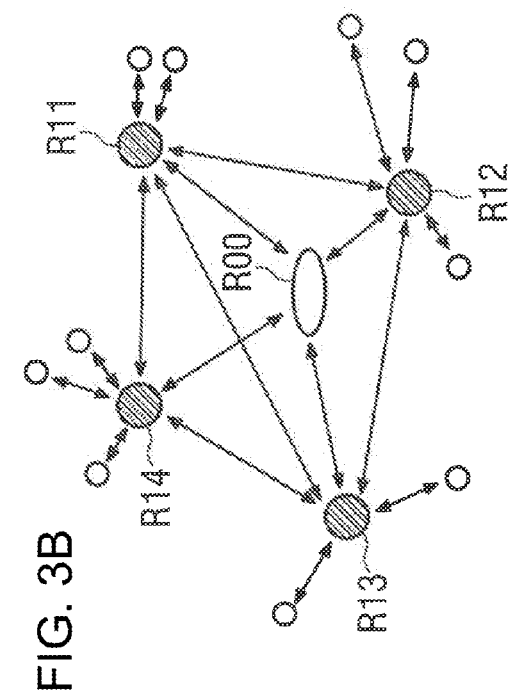
Figure 3A:
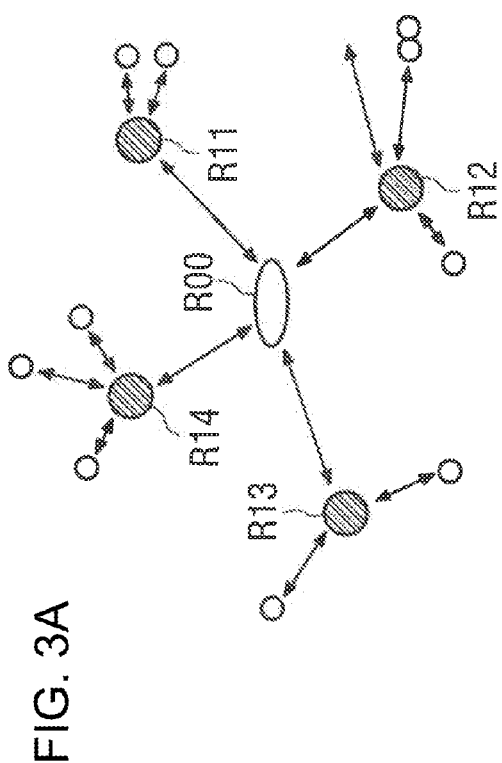
Figure 3C:
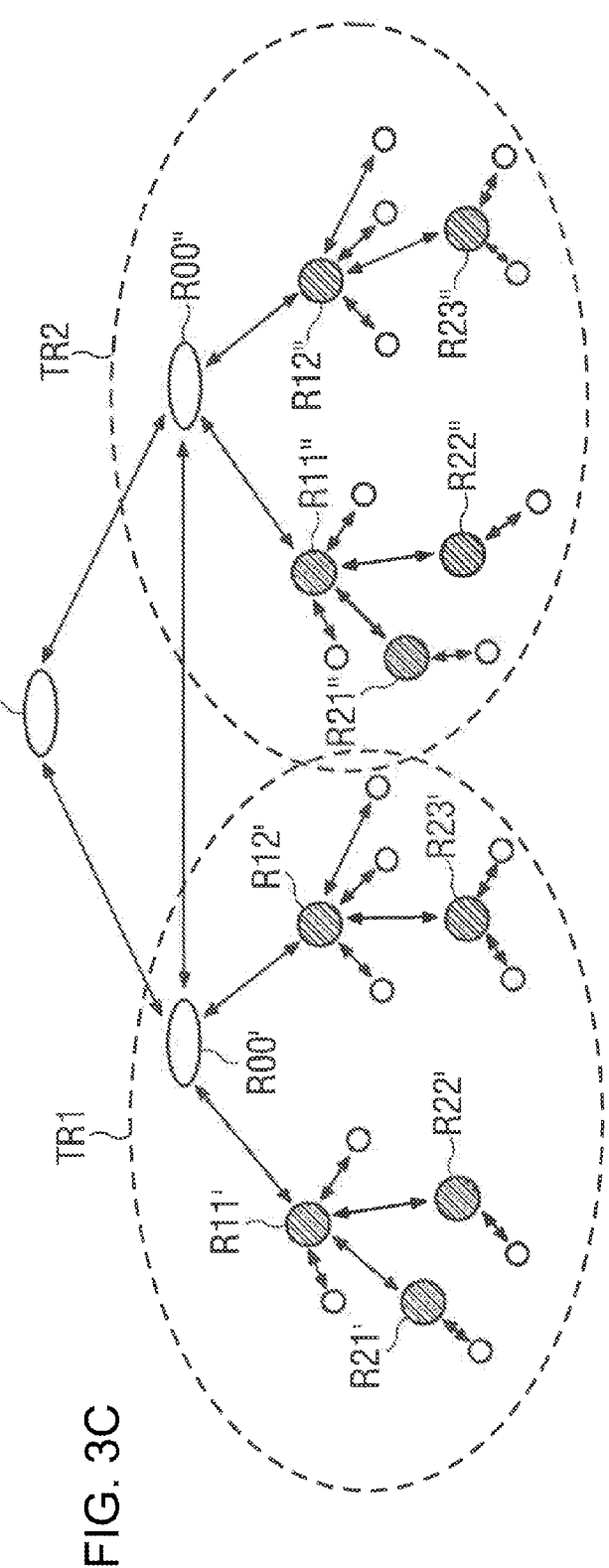
Figure 4:
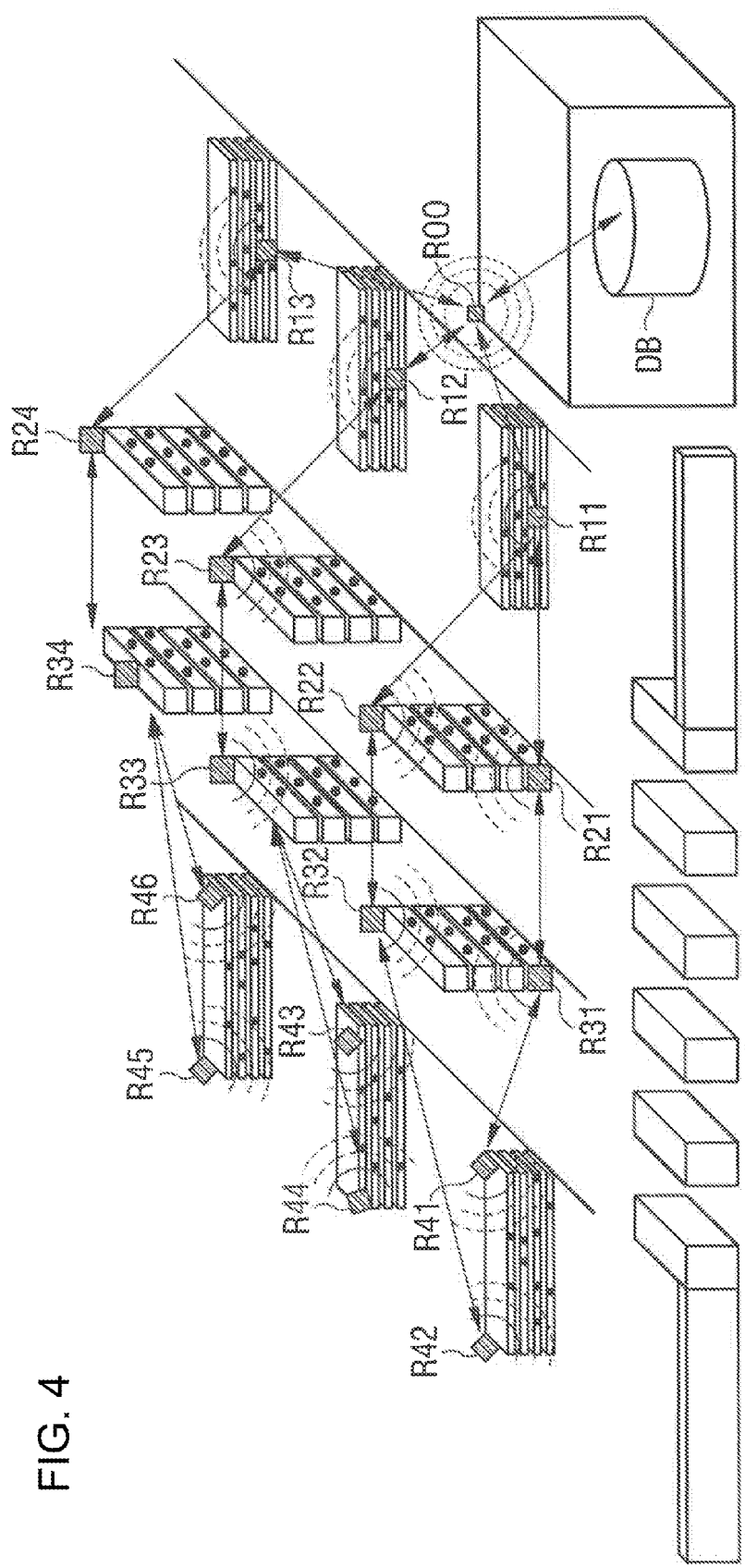
Figure 5A:
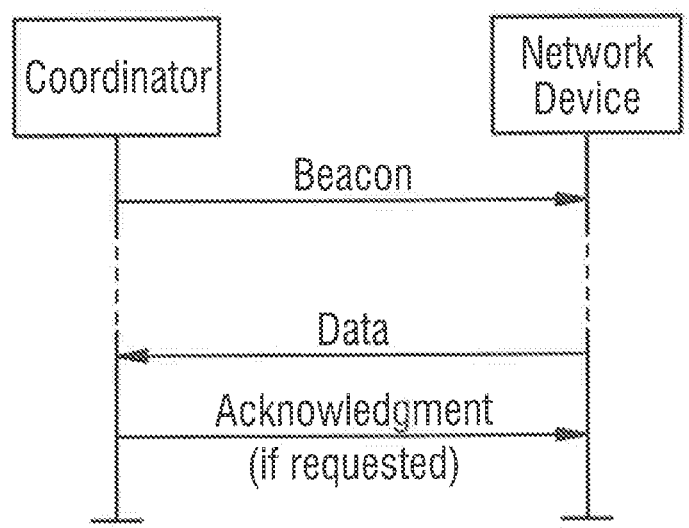
Figure 5B:
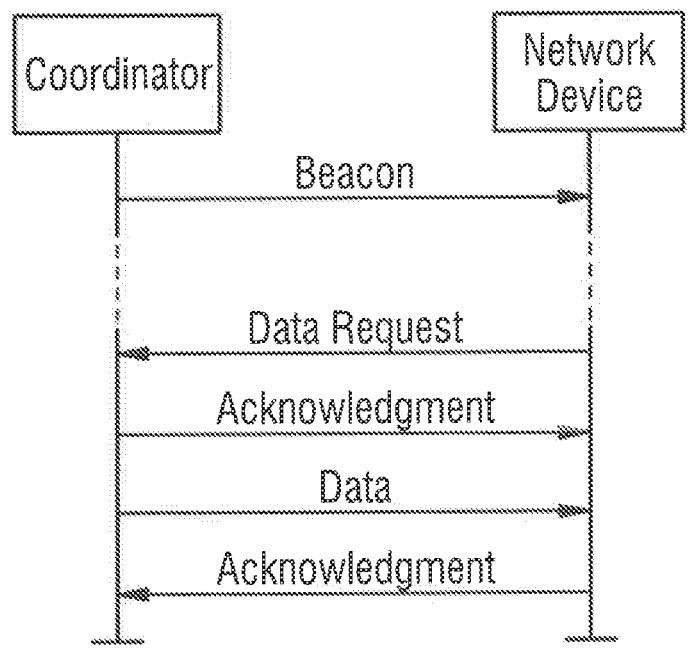
Figure 6:
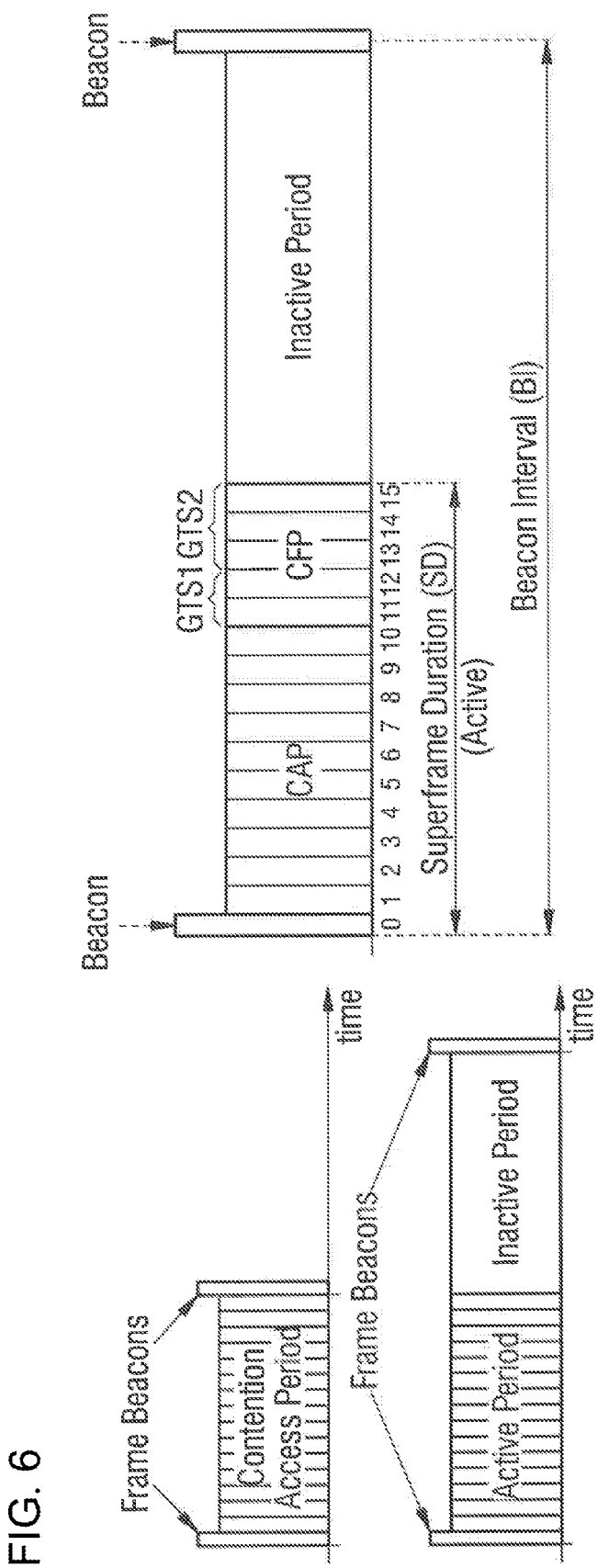
Figure 7:
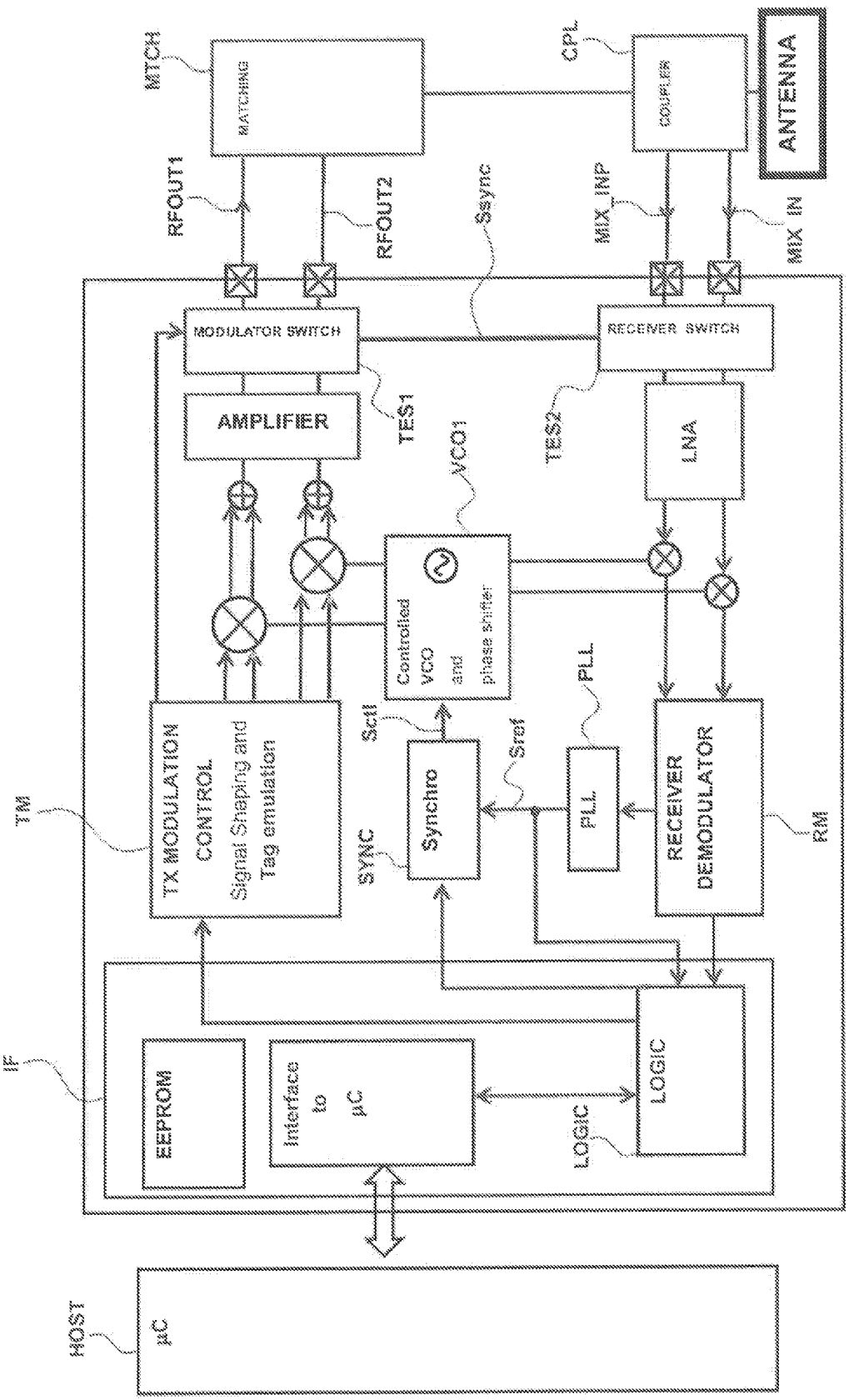

The text below explains the invention in detail using exemplary embodiments with reference to the drawings. Components and circuit elements that are functionally identical or have the identical effect bear identical reference numbers. In so far as circuit parts or components correspond to one another in function, a description of them will not be repeated in each of the following figures. Therein:

FIGS. 1A and 1B each show an exemplary embodiment of a UHF RFID reader according to the proposed principle, FIG. 2 shows an exemplary embodiment of an RFID network according to the proposed principle, FIGS. 3A, 3B and 3C each show an example for a network topology, FIG. 4 shows an exemplary application of the present invention, FIGS. 5A and 5B each show exemplary communication flows for beacon-based communication, FIG. 6 shows exemplary framing used in beacon-based communication, and FIG. 7 shows another exemplary embodiment of a UHF RFID reader according to the proposed principle.

FIGS. 1A and 1B each show an exemplary embodiment of a UHF RFID reader according to the proposed principle. The reader has a control module HOST, an interface module IF, a transmitter module TM, a receiver module RM, a tag emulation module TES1, TES2, IQM. The reader further has a power supply component PSC, a timing system TS, various digital-to-analog and analog-to-digital converters as indicated by the block CV and phase-locked loop functionality in the block PLL. Transmitter module TM, receiver module RM, tag emulation module TES1, TES2, IQM, converter module CV, timing system TS and power supply component PSC are coupled to the control module HOST via the interface module IF. The control module HOST comprises, for instance, a standard micro-processor with suitable memory.

The interface module IF comprises a memory component MEM, as well as control registers and a command logic. The memory component MEM is implemented, for instance, as a FIFO memory. It is used for the transfer of data between the control module HOST and receiver module or transmitter module, RM, TM, respectively. The memory component MEM is adapted to store data of RFID tags and/or data concerning the network topology of the RFID network. In contrast to readers known in the art, the memory component MEM is adapted to store data of a vast number of RFID tags, for instance at least 100 RFID data items. In the case of a main reader, the memory component MEM stores information on the network topology, for instance in the form of a table. In the case of a subordinate reader, the memory component MEM stores information on neighbouring subordinate readers, for instance in the form of a table, called neighbour table.

The power supply component PSC comprises various supply regulators, reference voltage generators and supply voltage regulator for the radio frequency parts of the transmitter module TM.

The control module HOST operates the reader in either a reader mode or in a tag emulation mode. Reader mode operation is comparable to an operation of an RFID reader known in the art by employing a well-defined protocol, either a standard protocol or a proprietary protocol. For the tag emulation mode an additional functionality is added to the reader in the form of the tag emulation module TES1, TES2, IQM. In the following, the standard functionality of reader module RM and transmitter module TM are described roughly with a focus on the differences between the embodiment of FIGS. 1A and 1B and state-of-the-art readers.

The transmitter module TM comprises a functionality for encoding data supplied via the memory component MEM according to the protocol used, for example the EPC Gen 2 protocol. A baseband signal is provided to the tag emulation module TEM.

The tag emulation module TEM comprises a first and a second tag emulator switch TES1, TES2 and a modulator component IQM which is implemented as part of the transmitter module TM. The first and the second tag emulator switches TES1, TES2 each comprise a controlled transistor. In order to achieve tag emulator capabilities in accordance, for instance, with existing standards like the EPC Gen 2 standard for RFID readers, an output impedance of the transmitter module TM is switched between two different states which are defined as matched state and unmatched state. The first tag emulator switch TES1 is connected to an output of an amplifier of the transmitter module TM. If the first tag emulator switch TES1 is open, an antenna connected to ports of output signals RFOUT1, RFOUT2 of the transmitter module TM is in the matched state, which means that it absorbs all the power. If the first tag emulator switch TES1 is closed, the antenna connected is in a mismatched or an unmatched state, which means that the antenna will reflect most of the power and absorb only a small amount of power. Corresponding functionality is achieved by the second tag emulator switch TES2 on the input side of the receiver module RM in case the RFID reader uses a separate antenna for the receiving side, as already described above.

In other words, the first tag emulator switch TES1 allows implementing passive load modulation by switching the ports of output signals RFOUT1 and RFOUT2 to a fixed load and consequently initiating backscattering through the antenna. Alternatively, the first tag emulator switch TES1 connects the ports of signals RFOUT1 and RFOUT2 directly to the amplifier and allows actively transmitting modulated signals.

In this embodiment the modulator component IQM comprises a single step I/Q modulator which provides a single-sideband radio frequency output signal to the amplifier of the transmitter module TM which generates therefrom the output signals RFOUT1, RFOUT2. As shown in FIGS. 1A and 1B, the I/Q-modulator IQM performs an up-conversion of the baseband signal using quadrature mixers. This transmitter architecture is universal, provides excellent performance and is extremely flexible with respect to supporting high data rates and different modulation formats of constant and non-constant envelope nature. The in-phase and quadrature baseband signals carrying transmit data are precisely processed and modulated in the digital domain before they progress to digital-to-analog converters followed by simple smoothing filters which drive the I/Q-modulator IQM.

By this, the reader is enabled to modulate the constant wave, meaning the RF carrier sent out by another reader by employing antenna impedance switching like tags normally do.

The receiver module RM is adapted to be able to detect commands received from another reader in the tag emulation mode. The receiver module RM also has standard functionality of a radio frequency receiver used in RFID readers known to a person skilled in the art. Differential input signals MIX_INP and MIX_INN are supplied to the receiver module RM or a single-ended RF input signal MIXS_IN is supplied to the receiver module RM. These input signals are filtered and digitized, a bit stream is generated and after byte-framing and removing of protocol overhead information, the received data is stored in the memory component MEM.

FIG. 2 shows an exemplary embodiment of an RFID network according to the proposed principle. The RFID network comprises one main reader R00, a number of subordinate readers Rxy, as well as tags Txy, wherein x stands for the depth or level of the reader/tag in the network tree and y is the number of the reader/tag within the depth x. The main reader R00, which can also be called root or coordinator of the network, is connected to a database DB via a network connection. Tags Txy are associated to the main reader R00 or subordinate reader Rxy depending on the respective operating range of a subordinate reader Rxy. For instance, tags T11 and T12 are in the operating range of the main reader R00. Tags T21 and T22 are associated to the subordinate reader R11. The associations between tags Txy and readers Rxy are symbolized by arrows. The subordinate readers Rxy are associated with the main reader R00 in the depicted hierarchical structure in the form of a network tree as shown in FIG. 2 and illustrated in the arrows between main and subordinate readers R00, Rxy. Tags Txy or subordinate readers Rxy associated to a reader are also called nodes or child nodes. Thereby, when starting out from subordinate reader R12, the next higher level reader is the main reader R00, the next lower level readers are readers R23 and R24.

The subordinate readers Rxy can also be called routers as they route data items on associated tags Txy to the next subordinate reader Rxy in direction to the main reader R00. For instance a data item provided by tag T43 is first transmitted to subordinate reader R38 and stored in its memory component. The content of the memory component of reader R38 is transferred to reader R24 following a specific command transmitted by the main reader R00 using a beacon signal to avoid collision. In the same way data on tag T43 is propagated via subordinate reader R12 to main reader R00.

As an example for the definition of the RFID network the routine described in the following might be completed. In depth 0 the main reader R00 sends the command inventory which is a standard command of the UHF Gen 2 protocol standard which is normally used to detect tags. According to the proposed principle, subordinate readers of depth 1 will reply to the inventory command. Thus, all subordinate readers which are directly accessible from depth 0 are detected. The tree structure up to depth 1 is defined by the main reader R00. Next, main reader R00 sends requests to all subordinate readers R11 and R12 of depth 1 to perform inventory. Each subordinate reader in depth 1, here readers R11 and R12, sends the inventory command. Thereby, subordinate readers R21, R22, R23 and R24 of depth 2 are detected. Readers R11 and R12 send information, like the identification numbers of the detected readers, link quality information from received signal strength indications or other suitable indicators back to the main reader R00. The inventory round is repeated correspondingly in depth 3. As a result, the network topology of the RFID network is defined as a tree.

In the following communication each of the subordinate readers Rxy is able to decode signals coming from other subordinate readers or from the main reader and is able to respond to the received signals using the tag emulation mode. Standard protocols like the UHF Gen 2 protocol are employed to synchronize the communication flow. For accessing memory contents of another reader Rxy to get data items of a tag Txy, a special address within the memory is used. Only the main reader R00 in each of the presented examples has a connection to a central database DB so that there is no extra cabling effort needed when deploying a system with a vast number of tags and readers.

As can be seen, the communication between readers Rxy is accomplished according to a defined protocol in an ad-hoc manner. For this protocol, existing protocols can be reused, for instance the ZigBee protocol IEEE 802.15.4. Even the UHF Gen 2 protocol can be reused. As a main advantage in a large-scale application, only the main reader R00 has to be connected to the database of a middleware.

FIGS. 3A, 3B and 3C each show an example for a topology of an RFID network according to the proposed principle. In FIG. 3A a star topology is depicted. Four subordinate readers R11, R12, R13 and R14 are each connected to the main reader R00. Each of the four subordinate readers has several tags indicated as blank circles within the respective reader's operating range.

FIG. 3B represents a peer-to-peer topology for the RFID network. Each of the four subordinate readers R11, R12, R13 and R14 is connected to each of the other subordinate readers as well as to the main reader R00. For example, subordinate reader R11 is connected to the main reader R00 and to the subordinate readers R12, R13 and R14.

FIG. 3C shows a cluster tree topology. This network topology comprises a first and a second tree TR1, TR2. The first tree TR1 has a main reader R00' and several subordinate readers with associated tags. The second tree TR2 has another main reader R00'', several subordinate readers with associated tags. The main readers R00' and R00'' of first and second tree TR1, TR2 are connected to each other, as well as to the central main reader R00.

According to the proposed principle, each of the three topologies presented in FIGS. 3A, 3B and 3C can be used for the RFID network. For each example, the main reader R00 defines the network topology in an initialization step. Each detected subordinate reader has an identification number and a network level assigned to it. The defined topology is stored in the main reader's R00 memory component. To guarantee that the communication amongst subordinate readers and main reader works, the main reader might redefine the topology of the RFID network after a while.

FIG. 4 shows an example of an application of the present invention. A store is drafted with a lot of shelves which are equipped with RFID readers marked as Rxy and associated tags, drawn as black dots. The main reader R00 is connected to a central main frame with a database DB. The subordinate readers are connected in a tree topology to the main reader R00. Each of the subordinate readers Rxy acts as a router using the tag emulation mode. In reader mode each subordinate reader detects tags and communicates with the associated tags. The network topology is thereby dynamic. It is defined and, if required, redefined by the main reader R00.

As can be easily seen, it is not necessary to equip each shelf with a network access interface, either in a wired or wireless manner. If a so-called micro-reader is used for the subordinate readers wherein a microreader is supplied from a battery, there is not even any need for a power supply network. Each reader can easily be moved to a different place when needed. The main reader R00 will reconfigure the network topology automatically. The RFID network according to the proposed principle is very easy to deploy.

FIGS. 5A and 5B each show an example of a beacon-based communication flow. In order to synchronize the entire RFID network and to save energy during times where no operation is required by the readers, beacon-based communication is used. A beacon is a well-defined signal, e.g. an RF signal, containing a sort of trigger. Immediately after the beacon signal information is transmitted which are needed for configuring subordinate readers to access the communication channel. The information concerns, e.g., a data sequence that defines all parameters needed to access the channel, like slot, timing and duration of the communication time. All the information transmitted with or immediately following the beacon signal are called beacon frame. Beacons are periodically sent by the main reader, e.g. reader R00 from FIG. 2, whenever communication with the subordinate readers is required, either for identification of new subordinate readers or for information exchange with the subordinate readers on the network topology as defined. Doing so, a superframe structure is defined as described below in FIG. 6. Optionally, an inactive period can be defined during which all readers may enter into a sleep mode to save energy. Subordinate readers may also generate beacons to their child nodes. The beacon transmission is scheduled in order to avoid frame collision. A beacon may also be generated by subordinate readers Rxy to interrogate further subordinate readers R(x+1)y at the next lower level.

This approach is suitable for the application in RFID networks which are characterized by a low duty cycle where no real time information is required. One example application, for instance, is an RFID network in a shop where the amount of items is monitored on each shelf.

During the absence of a beacon, each subordinate reader can interrogate associated tags or perform an inventory round as described above. Subsequently, the information on identified tags will be transmitted to the main reader upon the main reader's request with the next beacon signal.

In other words, network communication is initiated by a beacon transmitted by the main reader on a specific frequency channel. All subordinate readers are listening in this specific channel and will start operation only after detecting the beacon. This means that the communication start time and the parameters for synchronizing communication, i.e. time slot, data rates and information to transmit back to the main reader, is transmitted from the main reader to the listening subordinate readers by means of the beacon frame. Next, the main reader waits for some time. During this waiting time, the subordinate readers are allowed to reply to the request of the main reader. At the end of the waiting time, a further beacon frame is sent out by the main reader to indicate that the transmission time has ended and radio needs to be turned off. This communication scheme is depicted in FIGS. 5A and 5B. The coordinator can be the main reader or a subordinate reader. The network device may either by a next subordinate reader or a tag according to the defined network topology.

As described above, in FIG. 5A a beacon is sent out from the main reader or from a subordinate reader. The subordinate reader or the tag sends data back in reply to the beacon. Optionally, an acknowledgement might be sent by the coordinator.

FIG. 5B shows the special case in which, as described earlier, the network device needs information from the coordinator to update its neighbour table stored in the memory component. This might happen if the neighbour table got lost or if a reader is replaced. In this case, the network device replies to the beacon sent out by the coordinator with a data request. This data request is acknowledged by the coordinator and subsequently, the requested data is transmitted from coordinator to the network device. The receipt of the data is acknowledged by the network device. This scheme is also used for any other case where it is necessary to restore certain information in a subordinate reader's local memory component.

FIG. 6 shows an exemplary framing used in beacon-based communication. In this example, beacon-based communication and synchronization is implemented using the standard protocol of IEEE 802.15.4. The structure of time frames of the protocol is shown in relation to time. Each frame starts and ends with a beacon. A contention access period CAP is in between the beacons. The contention access period is divided into an active period and an inactive period. The active period is used by the main reader, in the inactive period subordinate readers may send their data in reply to the beacon.

The superframe structure as shown in FIG. 6 has a Beacon Interval BI which defines the time between two consecutive beacon frames and a Superframe Duration SD which defines the active portion in the Beacon Interval BI and is divided into a number of N equally-sized time slots. The Figure shows an exemplary Superframe Duration SD having 16 slots. During the slots frame transmissions are allowed. Optionally, an inactive period is defined if the period of the Beacon Interval BI is longer than the period of the Superframe Duration SD. If an inactive period exists, all nodes may enter in a sleep mode to save energy or perform tag inventory in this time.

During the Superframe Duration SD in a Contention Access Period CAP, nodes compete for medium access using mechanisms compliant with ISO180006c or EPCgen2 by based on random time slot access or any other protocol suitable for media access. In case of timing-sensitive applications, the IEEE 802.15.4 protocol enables the definition of a Contention-Free Period CFP within the Superframe Duration SD by the allocation of Guaranteed Time Slots GTS.

In an alternative approach, the UHF Gen2 protocol is used for communication amongst main and subordinate readers. Thereby, synchronization of the devices is achieved by a wake-up signal of the protocol.

FIG. 7 shows another exemplary embodiment of a UHF RFID reader according to the proposed principle. The following description is based on the embodiment of FIGS. 1A and 1B with a focus on differences to FIGS. 1A and 1B. The interface component IF translates signals between components of the UHF RFID reader and the control module HOST according to a digital I/O interface. A component LOGIC thereby handles data coming from the control component HOST and from the demodulator within the receiver module RM and organizes them in a FIFO system in order to exchange them with the TX modulation control function within the transmitter module TM and with the control module HOST for further processing.

The transmitter module TM organizes data coming from the component LOGIC in accordance with the EPC Gen2 Protocol and/or any other protocol supported by the UHF RFID reader. At outputs of the transmitter module TM I/Q baseband signals are provided ready for modulation or mixing with a carrier signal which is generated locally by a voltage controlled oscillator VCO1.

The voltage controlled oscillator VCO1 generates the carrier at zero degrees and 90 degrees i.e. shifted needed to modulate the I/Q signals generated by the transmitter module TM. The voltage controlled oscillator VCO1 is operated by a control signal Sct1. The control signal Sct1 defines a frequency and a reference phase at zero degrees of the locally generated carrier. The control signal Sct1 is provided by a synchronization block SYNC which is directed by the component LOGIC. The synchronization block SYNC additionally uses a reference signal Sref provided by a phase-locked loop PLL. The reference signal Sref is e.g. extruded from the received signals MIX_INP and MIX_INN by means of the receiver module RM.

The receiver module RM comprises all the functionality needed to demodulate the input signals MIX_INP and MIX_INN and to extract the baseband signal containing received payload. The received payload is placed in a FIFO inside the component LOGIC and is transferred to the control module HOST via its interface.

The first tag emulator switch TES1 is connected to the transmitter module TM which is controlled by the component LOGIC and by the control module HOST via its interface.

The second tag emulator switch TES2 is additionally coupled to the first tag emulator switch TES1 by means of a synchronizing signal Ssync to highlight that it switches synchronously with the first tag emulator switch TES1.

The antenna is connected to the ports of input signals MIX_INP and MIX_INN via a coupling component CPL. The output signals RFOUT1 and RFOUT2 are transferred to the antenna via a matching component MTCH and the coupling component CPL.

With this embodiment operation of the UHF RFID reader as an active tag in tag emulation mode can be realized. The active tag tag emulation differs from the operation in reader mode only in the generated baseband I/Q pattern, e.g. either a reader command or a tag answer to a received signal are generated, and in the phase of the signal of the local voltage controlled oscillator VCO1. The different modes of operation are controlled by the component LOGIC.

REFERENCE LIST

TM transmitter module
RM receiver module
TES1, TES2 switch
IQM modulator
PSC power supply component
MEM memory component
CV converter
TS timing system
IF interface module
HOST control module
Rxy reader
Txy tag
DB database
MIX_INP, MIX_INN signal
MIXS_IN signal
RFOUT1, RFOUT2 signal
PLL phase-locked loop
TR1, TR2 tree

The invention claimed is:

1. A Radio Frequency Identification (RFID) network comprising:
   a main ultra-high-frequency (UHF) RFID reader and a plurality of subordinate UHF RFID readers,
   wherein for each of the main UHF RFID reader and the plurality of subordinate UHF RFID readers:
      the UHF RFID reader is adapted to selectively operate in either a reader mode or in a tag emulation mode,
      in the reader mode, the UHF RFID reader communicates with at least one RFID tag to access the at least one tag's memory contents, and
      in the tag emulation mode, the UHF RFID reader communicates with at least one other UHF RFID reader to share memory content with the at least one other RFID reader,
   the main RFID reader being adapted to be coupled to a database via a network connection, and the subordinate RFID readers being coupled to the main reader; and
   a plurality of RFID tags, each tag associated with one subordinate reader or with the main reader in function of the main or subordinate reader's operating range,
   wherein the main reader is adapted to communicate with the subordinate readers in accordance with a topology of the RFID network and to exchange data from the plurality of tags with the database,
   wherein each subordinate reader is adapted to communicate with the main reader or another subordinate reader in accordance with the defined network topology using the tag emulation mode and to send an RFID request or an RFID command to associated RFID tags using the reader mode, and
   wherein each RFID tag is adapted to generate an RFID response to the RFID command or the RFID request sent by the main reader or the main reader's associated subordinate reader.

2. The RFID network according to claim 1, wherein the main reader is setup to initiate the communication with the subordinate readers, to define the topology of the RFID network and to store the defined topology.

3. A method for communication in a Radio Frequency Identification (RFID) network, comprising:
   performing by a main ultra-high-frequency (UHF) RFID reader an initialisation of a network topology of the RFID network according to claim 1 or 2; and
   operating either in tag emulation mode or in reader mode.

4. The method according to claim 3, wherein the initialisation of the topology comprises:
   detecting subordinate readers present in the network;
   assigning to each detected subordinate reader an identification number and a network level;
   defining the topology of the RFID network; and
   storing the defined topology in the main reader's memory component.

5. The method according to claim 4, wherein detecting subordinate readers present in the network comprises:
   sending a beacon signal for communication start;
   receiving response to the beacon signal from the subordinate readers present in the network; and
   sending a beacon signal for communication end.

6. The method according to claim 3, wherein operating in reader mode comprises:
   sending, by a subordinate RFID reader or by the main reader, a request to an associated RFID tag, respectively; and
   storing, by the subordinate reader or by the main reader, a data item received from the associated tag, respectively.

7. The method according to claim 3, wherein operating in tag emulation mode comprises:
   accessing, by the main reader at least one data item stored in the subordinate reader;
   sending, by the main reader, the beacon signal for communication start;
   receiving a request for data from the subordinate reader; and
   transmitting, by the main reader, the requested data to the subordinate reader.

* * * * *